(12) United States Patent
Matsuoka et al.

(10) Patent No.: US 12,218,617 B2
(45) Date of Patent: Feb. 4, 2025

(54) CONTROLLER FOR ELECTRIC MOTOR

(71) Applicant: KABUSHIKI KAISHA TOYOTA JIDOSHOKKI, Kariya (JP)

(72) Inventors: Daisuke Matsuoka, Aichi-ken (JP); Masamichi Nawa, Aichi-ken (JP)

(73) Assignee: KABUSHIKI KAISHA TOYOTA JIDOSHOKKI, Kariya (JP)

( * ) Notice: Subject to any disclaimer, the term of this patent is extended or adjusted under 35 U.S.C. 154(b) by 117 days.

(21) Appl. No.: 17/915,726

(22) PCT Filed: Mar. 24, 2021

(86) PCT No.: PCT/JP2021/012201
§ 371 (c)(1),
(2) Date: Sep. 29, 2022

(87) PCT Pub. No.: WO2021/200456
PCT Pub. Date: Oct. 7, 2021

(65) Prior Publication Data
US 2023/0133739 A1    May 4, 2023

(30) Foreign Application Priority Data

Apr. 3, 2020  (JP) ................. 2020-067198

(51) Int. Cl.
*H02P 3/18*    (2006.01)
*H02P 21/18*   (2016.01)
*H02P 21/22*   (2016.01)

(52) U.S. Cl.
CPC ............... *H02P 3/18* (2013.01); *H02P 21/18* (2016.02); *H02P 21/22* (2016.02)

(58) Field of Classification Search
CPC .......... H02P 21/22; H02P 21/18; H02P 21/36; H02P 3/18; H02P 21/26
See application file for complete search history.

(56) References Cited

U.S. PATENT DOCUMENTS

| 2005/0217945 | A1* | 10/2005 | Kimura ................. | B66B 11/008 |
| | | | | 187/277 |
| 2006/0161273 | A1* | 7/2006 | Bizard ................. | G01P 13/045 |
| | | | | 702/145 |
| 2014/0028224 | A1* | 1/2014 | Arima ..................... | H02P 21/24 |
| | | | | 318/400.02 |

FOREIGN PATENT DOCUMENTS

| JP | 62-081990 A | 4/1987 |
| JP | 05-284610 A | 10/1993 |
| JP | 2000-312499 A | 11/1999 |
| JP | 2019-118217 A | 7/2019 |

* cited by examiner

*Primary Examiner* — Bickey Dhakal
(74) *Attorney, Agent, or Firm* — Sughrue Mion, PLLC

(57) ABSTRACT

A controller for an electric motor comprises: an estimator configured to estimate a position of a rotor by using a d-axis current, a q-axis current, a d-axis voltage command value, and a q-axis voltage command value from which a noise is removed by a filter having a first time constant when a torque command value is equal to or greater than zero, and estimate a rotational speed of the electric motor and the position by using the d-axis current, the q-axis current, the d-axis voltage command value, and the q-axis voltage command value from which a noise is removed by a filter having a second time constant smaller than the first time constant when the torque command value is less than zero.

4 Claims, 5 Drawing Sheets

CONTROLLER FOR ELECTRIC MOTOR

CROSS-REFERENCE TO RELATED APPLICATIONS

This application is a National Stage of International Application No. PCT/JP2021/012201 filed Mar. 24, 2021, claiming priority based on Japanese Patent Application No. 2020-067198 filed Apr. 3, 2020, the contents of all of which are incorporated herein by reference in their entirety.

TECHNICAL FIELD

The present disclosure relates to a controller for an electric motor.

BACKGROUND ART

Some of controllers for an electric motor apply negative torque to the electric motor so as to promote a decrease in the rotational speed of the electric motor when stopping the electric motor. A related technology is mentioned in Patent Literature 1.

When the rotational speed of the electric motor is estimated using a current flowing in the electric motor and a voltage command value from which a noise is removed by a filter, the estimated rotational speed may differ from the actual rotational speed due to a delay of the estimation of the rotational speed depending on a time constant of the filter.

Accordingly, when the rotational speed of the electric motor is estimated using the current and the voltage command value from which the noise is removed by the filter and negative torque is applied to the electric motor so as to stop the electric motor, some of the controllers may continuously apply negative torque to the electric motor if the estimated speed has not become zero despite the actual rotational speed is already zero, which may cause the actual rotational speed value to be negative or reverse the rotation of the electric motor.

CITATION LIST

Patent Literature

[Patent Literature 1] Japanese Patent Application Publication No. H05-284610

SUMMARY OF INVENTION

Technical Problem

An object according to one aspect of the present disclosure is that a controller for an electric motor suppresses a reverse rotation of an electric motor while reducing time required for stopping the electric motor.

Solution to Problem

A controller for an electric motor as an embodiment according to the present disclosure comprises: a torque controller configured to calculate a torque command value by using a difference between a rotational speed of the electric motor and a rotational speed command value; a first converter configured to convert the torque command value into a d-axis current command value and a q-axis current command value; a second converter configured to convert a current flowing in the electric motor to a d-axis current and a q-axis current by using a position of a rotor of the electric motor; a current controller configured to calculate a d-axis voltage command value such that a difference between the d-axis current and the d-axis current command value is reduced, and calculate a q-axis voltage command value such that a difference between the q-axis current and the q-axis current command value is reduced; an estimator configured to estimate the position of the rotor by using the d-axis current, the q-axis current, the d-axis voltage command value, and the q-axis voltage command value from which a noise is removed by a filter having a first time constant when the torque command value is equal to or greater than zero, and estimate the rotational speed of the electric motor and the position of the rotor by using the d-axis current, the q-axis current, the d-axis voltage command value, and the q-axis voltage command value from which a noise is removed by a filter having a second time constant smaller than the first time constant when the torque command value is less than zero; a third converter configured to convert the d-axis voltage command value and the q-axis voltage command value into voltage command values respectively corresponding to phases of the electric motor by using the position of the rotor; and a drive circuit configured to drive the electric motor by a result of a comparison between a carrier wave and the voltage command values respectively corresponding to the phases of the electric motor.

This configuration may suppress the estimation delay of the rotational speed while applying negative torque to the electric motor so as to stop the electric motor, thereby suppressing the reverse rotation of the electric motor while reducing time required for stopping the electric motor.

In addition, the third converter may be configured to set the voltage command values respectively corresponding to the phases of the electric motor to zero when the torque command value is less than zero and the rotational speed is equal to or less than a first threshold.

This configuration may stop applying torque to the electric motor and reduce the rotational speed to zero by using a friction force or the like acting on the rotor after reducing the rotational speed to the first threshold while applying negative torque to the electric moto so as to stop the electric motor. This configuration may therefore prevent the reverse rotation of the electric motor while reducing time required for stopping the electric motor.

The position estimator may be configured to estimate the rotational speed of the electric motor and the position of the rotor by using the d-axis current, the q-axis current, the d-axis voltage command value, and the q-axis voltage command value from which a noise is removed by the filter having the second time constant when the torque command value is less than zero and the rotational speed is equal to or less than a second threshold, and estimate the rotational speed of the electric motor and the position of the rotor by using the d-axis current, the q-axis current, the d-axis voltage command value, and the q-axis voltage command value from which a noise is removed by a filter having a third time constant smaller the first time constant and larger than the second time constant when the torque command value is less than zero and the rotational speed is greater than the second threshold.

This configuration may suppress the estimation delay of the rotational speed and a decrease in the reliability of the d-axis current, the q-axis current, the d-axis voltage command value, and the q-axis voltage command value while applying negative torque to the electric motor so as to stop the electric motor, thereby further suppressing the reverse rotation of the electric motor while reducing time required for stopping the electric motor.

Advantageous Effects of Invention

According to the present disclosure, a controller for an electric motor is capable of suppressing a reverse rotation of an electric motor while reducing time required for stopping the electric motor.

DESCRIPTION OF EMBODIMENTS

Embodiments will be described in detail below with reference to the drawings.

Figure 1:
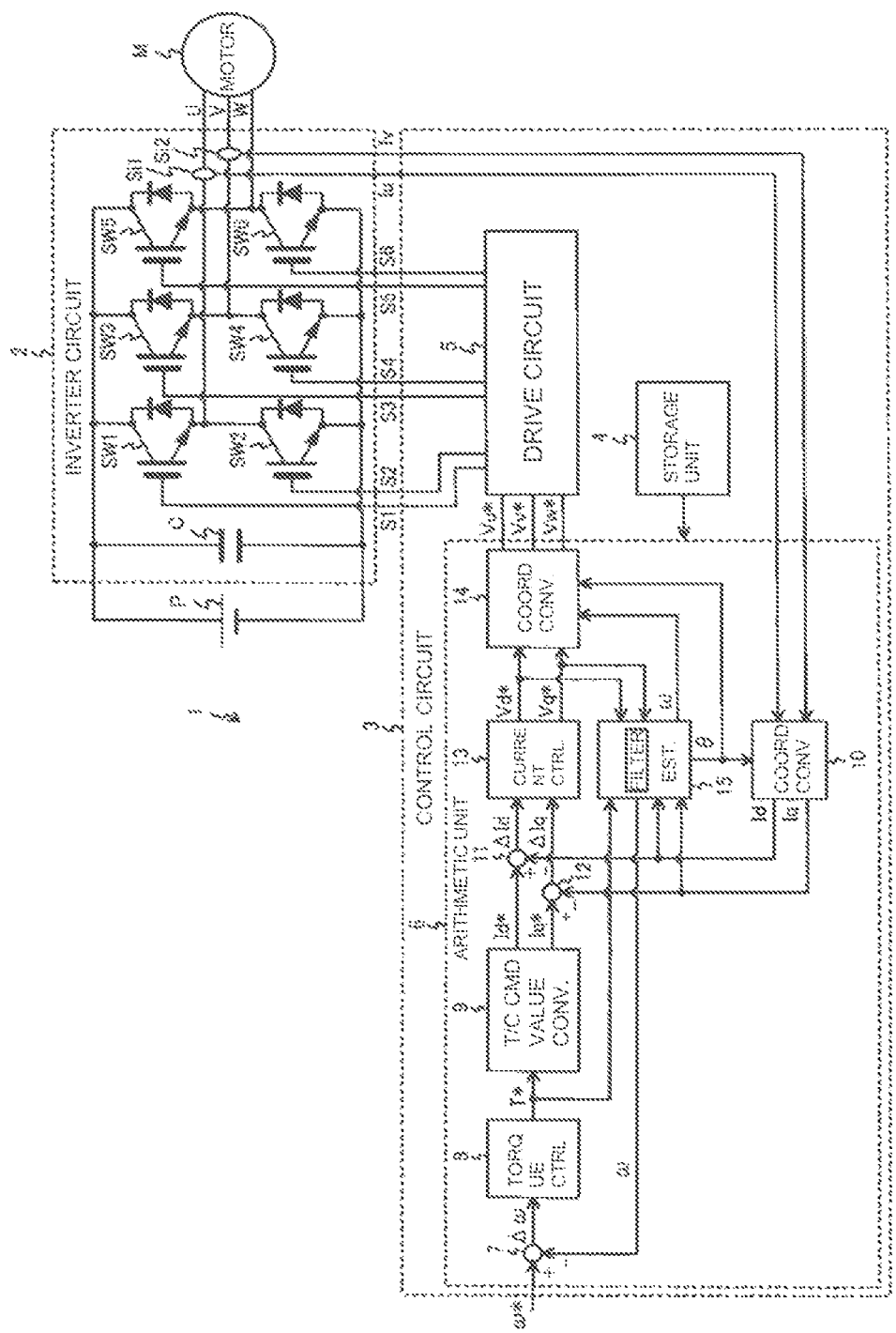
FIG. 1 is a diagram illustrating one example of a controller for an electric motor of an embodiment.

FIG. 1 is a diagram illustrating one example of a controller for an electric motor of an embodiment.

A controller 1 illustrated in FIG. 1, which is for example a controller for driving an electric motor M (a permanent magnet synchronous motor or the like) mounted on a vehicle (an electric forklift truck, a plug-in hybrid vehicle, or the like), includes an inverter circuit 2 and a control circuit 3.

The inverter circuit 2 drives the electric motor M by converting direct-current power supplied from a power supply P into alternating-current power, and includes a capacitor C, switching elements SW1 to SW6 (an insulated gate bipolar transistor (IGBT) or the like), and current sensors Si1 and Si2. In other words, one end of the capacitor C is connected to a positive electrode terminal of the power supply P and each of collector terminals of the switching elements SW1, SW3, and SW5, and the other end of the capacitor C is connected to a negative electrode terminal of the power supply P and each of emitter terminals of the switching elements SW2, SW4, and SW6. The connection point between an emitter terminal of the switching element SW1 and a collector terminal of the switching element SW2 is connected to a U-phase input terminal of the electric motor M via the current sensor Si1. The connection point between an emitter terminal of the switching element SW3 and a collector terminal of the switching element SW4 is connected to a V-phase input terminal of the electric motor M via the current sensor Si2. The connection point between an emitter terminal of the switching element SW5 and a collector terminal of the switching element SW6 is connected to a W-phase input terminal of the electric motor M.

The capacitor C smooths voltage that is output from the power supply P to the inverter circuit 2.

The switching element SW1 is turned on with a pulse width modulation signal Sg1 output from the control circuit 3 at a high level, and turned off with the pulse width modulation signal Sg1 at a low level. The switching element SW2 is turned on with a pulse width modulation signal Sg2 output from the control circuit 3 at a high level, and turned off with the pulse width modulation signal Sg2 at a low level. The switching element SW3 is turned on with a pulse width modulation signal Sg3 output from the control circuit 3 at a high level, and turned off with the pulse width modulation signal Sg3 at a low level. The switching element SW4 is turned on with a pulse width modulation signal Sg4 output from the control circuit 3 at a high level, and turned off with the pulse width modulation signal Sg4 at a low level. The switching element SW5 is turned on with a pulse width modulation signal Sg5 output from the control circuit 3 at a high level, and turned off with the pulse width modulation signal Sg5 at a low level. The switching element SW6 is turned on with a pulse width modulation signal Sg6 output from the control circuit 3 at a high level, and turned off with the pulse width modulation signal Sg6 at a low level.

When the switching elements SW1 to SW6 are each turned on or off, the direct-current voltage output from the power supply P is converted into alternating-current voltages Vv, Vu, and Vw that differ in phase from each other by 120 degrees. The alternating-current voltage Vu, the alternating-current voltage Vv, and the alternating-current voltage Vw are applied respectively to the U-phase input terminal, V-phase input terminal, and W-phase input terminal of the electric motor M, so that alternating currents Iu, Iv, and Iw that differ in phase from each other by 120 degrees flow to the electric motor M and therefore rotate the rotor of the electric motor M.

The current sensor Si1 includes a Hall element and a shunt resistor, and detects the alternating current Iu flowing through the U-phase of the electric motor M and outputs the alternating current Iu to the control circuit 3. In addition, the current sensor Si2 includes a Hall element and a shunt resistor, and detects the alternating current Iv flowing through the V-phase of the electric motor M, and outputs the alternating current Iv to the control circuit 3.

The control circuit 3 includes a storage unit 4, a drive circuit 5, and an arithmetic unit 6.

The storage unit 4 includes a random access memory (RAM) or a read only memory (ROM), and stores a first threshold, a second threshold, and the like, which will be described later.

The drive circuit 5 includes an integrated circuit (IC), compares a U-phase voltage command value Vu*, V-phase voltage command value Vv*, and W-phase voltage command value Vw* output from the arithmetic unit 6 with a carrier wave, and outputs the pulse width modulation signals Sg1 to Sg6 corresponding to the comparison results to the respective gate terminals of the switching elements SW1 to SW6. The carrier wave is a triangular wave, a sawtooth wave (sawtooth wave), an inverse sawtooth wave, or the like.

For example, the drive circuit 5 outputs the pulse width modulation signal Sg1 at a high level and the pulse width modulation signal Sg2 at a low level when the U-phase voltage command value Vu* is equal to or greater than the carrier wave, and outputs the pulse width modulation signal Sg1 at a low level and the pulse width modulation signal Sg2 at a high level when the U-phase voltage command value Vu* is smaller than the carrier wave. The drive circuit 5 outputs the pulse width modulation signal Sg3 at a high level and the pulse width modulation signal Sg4 at a low level when the V-phase voltage command value Vv* is equal to or greater than the carrier wave, and outputs the pulse width modulation signal Sg3 at a low level and the pulse width modulation signal Sg4 at a high level when the V-phase voltage command value Vv* is smaller than the carrier wave. The drive circuit 5 outputs the pulse width modulation signal Sg5 at a high level and the pulse width modulation signal Sg6 at a low level when the W-phase voltage command value Vw* is equal to or greater than the carrier wave, and outputs the pulse width modulation signal Sg5 at a low level and the pulse width modulation signal Sg6 at a high level when the W-phase voltage command value Vw* is smaller than the carrier wave.

The arithmetic unit 6 includes a microcomputer, and includes a subtraction unit 7, a torque controller 8, a torque/current command value converter 9 (i.e., a first converter), a coordinate converter 10 (i.e., a second converter), a subtraction unit 11, a subtraction unit 12, a current controller 13, a coordinate converter 14 (i.e., a third converter), and an estimator 15. For example, the microcomputer executes a program stored in the storage unit 4 to activate the subtraction unit 7, the torque controller 8, the torque/current command value converter 9, the coordinate converter 10, the subtraction unit 11, the subtraction unit 12, the current controller 13, the coordinate converter 14, the estimator 15, and a filter (which will be described later) in the estimator 15.

The subtraction unit 7 calculates a difference $\Delta\omega$ between a rotational speed command value $\omega^*$ input from the outside and a rotational speed w output from the estimator 15.

The torque controller 8 uses the difference $\Delta\omega$ output from the subtraction unit 7 to calculate a torque command value T*. For example, the torque controller 8 refers to information, which is stored in the storage unit 4 and in which the rotational speed of the electric motor M and the torque of the electric motor M are associated with each other, to determine the torque, which corresponds to the rotational speed equivalent to the difference $\Delta\omega$, as the torque command value T*.

The torque/current command value converter 9 converts the torque command value T* output from the torque controller 8 into a d-axis current command value Id* and a q-axis current command value Iq*. For example, the torque/current command value converter 9 refers to information, which is stored in the storage unit 4 and in which the torque of the electric motor M and the d-axis current command value Id* and q-axis current command value Iq* are associated with each other, to determine the d-axis current command value Id* and the q-axis current command value Iq*, which correspond to the torque equivalent to the torque command value T*.

The coordinate converter 10 uses the alternating current Iu detected by the current sensor Si1 and the alternating current Iv detected by the current sensor Si2 to determine the alternating current Iw flowing through the W phase of the electric motor M. The currents detected by the current sensors Si1 and Si2 are not limited to the combination of the alternating current Iu and the alternating current Iv, and may be a combination of the alternating current Iv and the alternating current Iw or a combination of the alternating current Iu and the alternating current Iw. In the case where the alternating currents Iv and Iw are detected by the current sensors Si1 and Si2, the coordinate converter 10 uses the alternating currents Iv and Iw to determine the alternating current Iu. In the case where the alternating currents Iu and Iw are detected by the current sensors Si1 and Si2, the coordinate converter 10 uses the alternating currents Iu and Iw to determine the alternating current Iv.

In addition, the coordinate converter 10 converts the alternating currents Iu, Iv, and Iw into a d-axis current Id (a current component for flux-weakening) and a q-axis current Iq (a current component for generating torque) by using a position $\theta$ (a phase of the rotor from the reference position to the present position) estimated by the estimator 15. For example, the coordinate converter 10 converts the alternating currents Iu, Iv, and Iw into the d-axis current Id and the q-axis current Iq by using a conversion matrix C1 expressed in Expression 1 below.

[Math. 1]

$$C1 = \sqrt{\frac{2}{3}} \begin{bmatrix} \cos\theta & \cos(\theta - 2\pi/3) & \cos(\theta + 2\pi/3) \\ -\sin\theta & -\sin(\theta - 2\pi/3) & -\sin(\theta + 2\pi/3) \end{bmatrix} \quad \text{Expression 1}$$

In addition, in the case where the inverter circuit 2 further includes a current sensor Si3 for detecting the alternating current Iw flowing through the W phase of the electric motor M in addition to the current sensors Si1 and Si2, the coordinate converter 10 may be configured to convert the alternating currents Iu, Iv, and Iw detected by the current sensors Si1, Si2, and Si3 into the d-axis current Id and the q-axis current Iq by using the position $\theta$ output from the estimator 15.

The subtraction unit 11 calculates a difference $\Delta$Id between the d-axis current command value Id* output from the torque/current command value converter 9 and the d-axis current Id output from the coordinate converter 10.

The subtraction unit 12 calculates a difference $\Delta$Iq between the q-axis current command value Iq* output from the torque/current command value converter 9 and the q-axis current Iq output from the coordinate converter 10.

The current controller 13 calculates a d-axis voltage command value Vd* and a q-axis voltage command value Vq* by proportional integral (PI) control by using the difference $\Delta$Id output from the subtraction unit 11 and the difference $\Delta$Iq output from the subtraction unit 12. For example, the current controller 13 calculates the d-axis voltage command value Vd* by using Expression 2 below and calculates the q-axis voltage command value Vq* by using Expression 3 below. It is to be noted that Kp is a constant of a proportional term for the PI control, Ki is a constant of an integral term for the PI control, Lq is the q-axis inductance of a coil of the electric motor M, Ld is the d-axis inductance of the coil of the electric motor M, w is the rotational speed output from the estimator 15, and Ke is an induced voltage constant.

$d$-axis voltage command value $Vd^*=Kp\times$difference $\Delta Id+Ki\times\int(\text{difference}\Delta Id)-\omega LqIq$      Expression 2

$q$-axis voltage command value $Vq^*=Kp\times$difference $\Delta Iq+Ki\times\int(\text{difference}\Delta Iq)+\omega LdId+\omega Ke$      Expression 3

That is, the current controller 13 calculates the d-axis voltage command value Vd* such that the difference $\Delta$Id between the d-axis current Id and the d-axis current command value Id* is reduced, and calculates the q-axis voltage command value Vq* such that the difference $\Delta$Iq between the q-axis current Iq and the q-axis current command value Iq* is reduced.

The coordinate converter 14 converts the d-axis voltage command value Vd* and the q-axis voltage command value Vq* into the U-phase voltage command value Vu*, the V-phase voltage command value Vv*, and the W-phase voltage command value Vw* by using the position $\theta$ output from the estimator 15. For example, the coordinate converter 14 converts the d-axis voltage command value Vd* and the q-axis voltage command value Vq* into the U-phase voltage command value Vu*, the V-phase voltage command value Vv*, and the W-phase voltage command value Vw* by using a transformation matrix C2 expressed in Expression 4 below.

[Math. 2]

$$C2 = \sqrt{\frac{2}{3}} \begin{bmatrix} \cos\theta & -\sin\theta \\ \cos(\theta - 2\pi/3) & -\sin(\theta - 2\pi/3) \\ \cos(\theta + 2\pi/3) & -\sin(\theta + 2\pi/3) \end{bmatrix} \quad \text{Expression 4}$$

The estimator 15 estimates the rotational speed ω and the position θ by using the torque command value T* output from the torque controller 8, the d-axis current Id and the q-axis current Iq output from the coordinate converter 10, and the d-axis voltage command value Vd* and the q-axis voltage command value Vq* output from the current controller 13. For example, the estimator 15 determines the rotational speed ω by using a voltage equation expressed in Expression 5 below, and determines the position θ by multiplying the rotational speed ω by a predetermined time (an operation clock of the arithmetic unit 6, or the like). In the Expression, R expresses the resistance component of the coil of the electric motor M, and p expresses the differential operator.

[Math. 3]

$$\begin{bmatrix} Vd \\ Vq \end{bmatrix} = \begin{bmatrix} R + pLd & -\omega Lq \\ \omega Ld & R + pLq \end{bmatrix} \begin{bmatrix} Id \\ Iq \end{bmatrix} + \begin{bmatrix} 0 \\ \omega Ke \end{bmatrix} \quad \text{Expression 5}$$

Figure 2:
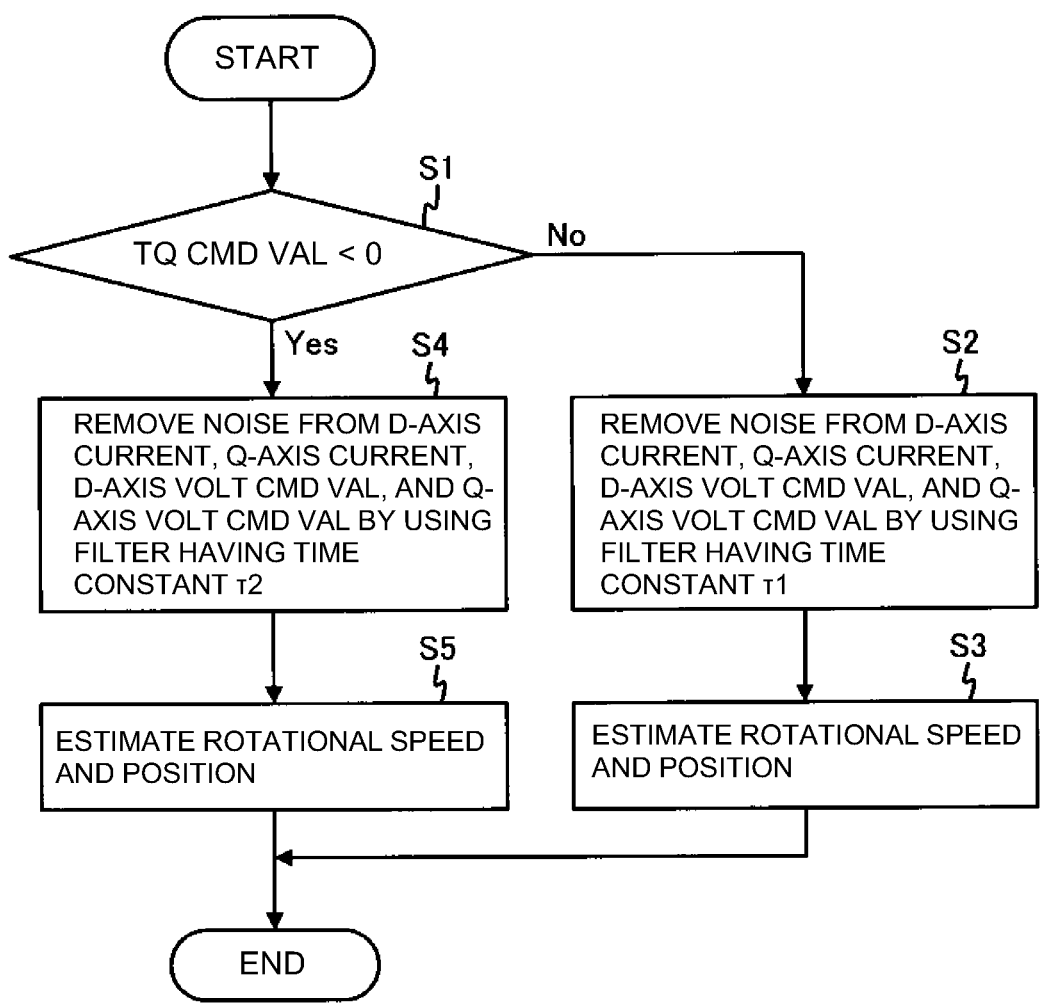
FIG. 2 is a flowchart illustrating one example of an operation of an estimator.

FIG. 2 is a flowchart illustrating an exemplary operation of the estimator 15.

First, when the torque command value T* is equal to or greater than zero (step S1: No), the estimator 15 removes a noise from the d-axis current Id, the q-axis current Iq, the d-axis voltage command value Vd*, and the q-axis voltage command value Vq* by using a filter having a time constant τ1 (i.e., a first time constant) (step S2), and estimates the rotational speed ω and the position θ by using the d-axis current Id, the q-axis current Iq, the d-axis voltage command value Vd*, and the q-axis voltage command value Vq* from which the noise is removed in step S2 (step S3).

When the torque command value T* is less than zero, in other words, when the electric motor M is driven by regenerative control (step S1: Yes), the estimator 15 removes a noise from the d-axis current Id, the q-axis current Iq, the d-axis voltage command value Vd*, and the q-axis voltage command value Vq* by using a filter having a time constant τ2 (i.e., a second time constant) smaller than the time constant τ1 (step S4), and estimates the rotational speed ω and the position θ by using the d-axis current Id, the q-axis current Iq, the d-axis voltage command value Vd*, and the q-axis voltage command value Vq* from which the noise is removed in step S4 (step S5).

That is, the estimator 15 removes a noise from the d-axis current Id, the q-axis current Iq, the d-axis voltage command value Vd*, and the q-axis voltage command value Vq* by using a filter having a relatively low cutoff frequency when the electric motor M is driven by power running control. This may increase the controllability of the electric motor M.

When the electric motor M is driven by regenerative control, the estimator 15 removes a noise from the d-axis current Id, the q-axis current Iq, the d-axis voltage command value Vd*, and the q-axis voltage command value Vq* by using a filter with a relatively short delay. This may suppress the estimation delay of the rotational speed ω and the position θ when the electric motor M is stopped.

Figure 3:
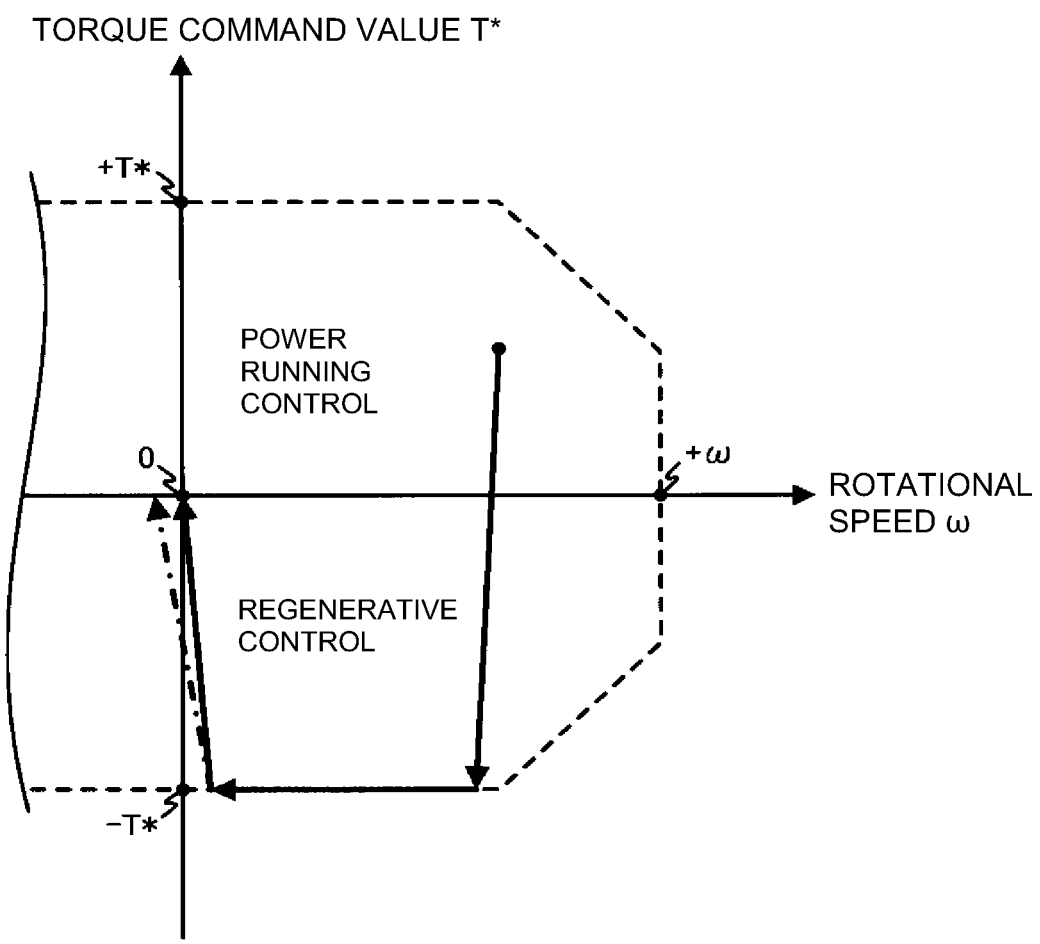
FIG. 3 is a diagram showing a relationship between a rotational speed and a torque command value.

FIG. 3 is a diagram showing a relationship between the rotational speed ω and the torque command value T*. The horizontal axis of a two-dimensional coordinate shown in FIG. 3 indicates the rotational speed ω, and the vertical axis thereof indicates the torque command value T*. Further, +ω, +T*, and −T* respectively indicate the maximum positive value of the rotational speed ω, the maximum positive value of the torque command value T*, and the maximum negative value of the torque command value T*. The rotational speed ω and the torque command value T* vary within a range indicated by a dashed line that passes through +ω, +T*, and −T*.

For example, it may be assumed that the electric motor M moves from a state where the rotational speed ω and the torque command value T* are positive values (a state where the electric motor M is driven by power running control) to a state where the rotational speed command value ω* rapidly becomes zero and the electric motor M is stopped.

In this case, the torque controller 8 changes the torque command value T* to the maximum negative value as indicated by the solid line in FIG. 3. This applies negative torque to the electric motor M, in other words, this allows the electric motor M to be driven by regenerative control, thereby allowing a more rapid decrease in the actual rotational speed as compared to a case where the electric motor M is stopped by a friction force acting on the rotor without applying the negative torque to the electric motor M.

In general, when the rotational speed ω is estimated using the d-axis current Id, the q-axis current Iq, the d-axis voltage command value Vd*, and the q-axis voltage command value Vq* from which a noise is removed by a filter, the estimation of the rotational speed ω is delayed depending on the time constant of the filter. Particularly, the estimation of the rotational speed ω is more likely to be delayed when the rotational speed ω is relatively low. Accordingly, when the torque command value T* moves from the maximum negative value toward zero as the estimated rotational speed ω approaches zero, the negative torque may be continuously applied to the electric motor M if the estimated rotational speed ω has not become zero despite the actual rotational speed is already zero, which may cause the actual rotational speed value to be negative as indicated by the dashed line in FIG. 3, in other words, which may reverse the rotation of the electric motor M.

The controller 1 according to this embodiment reduces the time constant of the filter in the estimator 15 when the torque command value T* is less than zero. This may suppress the estimation delay of the rotational speed ω when the electric motor M is stopped and the torque command value T* is less than zero, thereby allowing the estimated rotational speed ω to track the actual rotational speed. This therefore may suppress the reverse rotation of the electric motor M when the electric motor M is stopped. That is, the controller 1 according to this embodiment may suppress the estimation delay of the rotational speed ω while applying negative torque to the electric motor M so as to stop the electric motor M, so that the controller 1 is capable of suppressing the reverse rotation of the electric motor M while reducing time required for stopping the electric motor M.

The present disclosure is not limited to the embodiment above, and various improvements and changes may be made without departing from the gist of the present disclosure.

Modification Example 1

Figure 4:
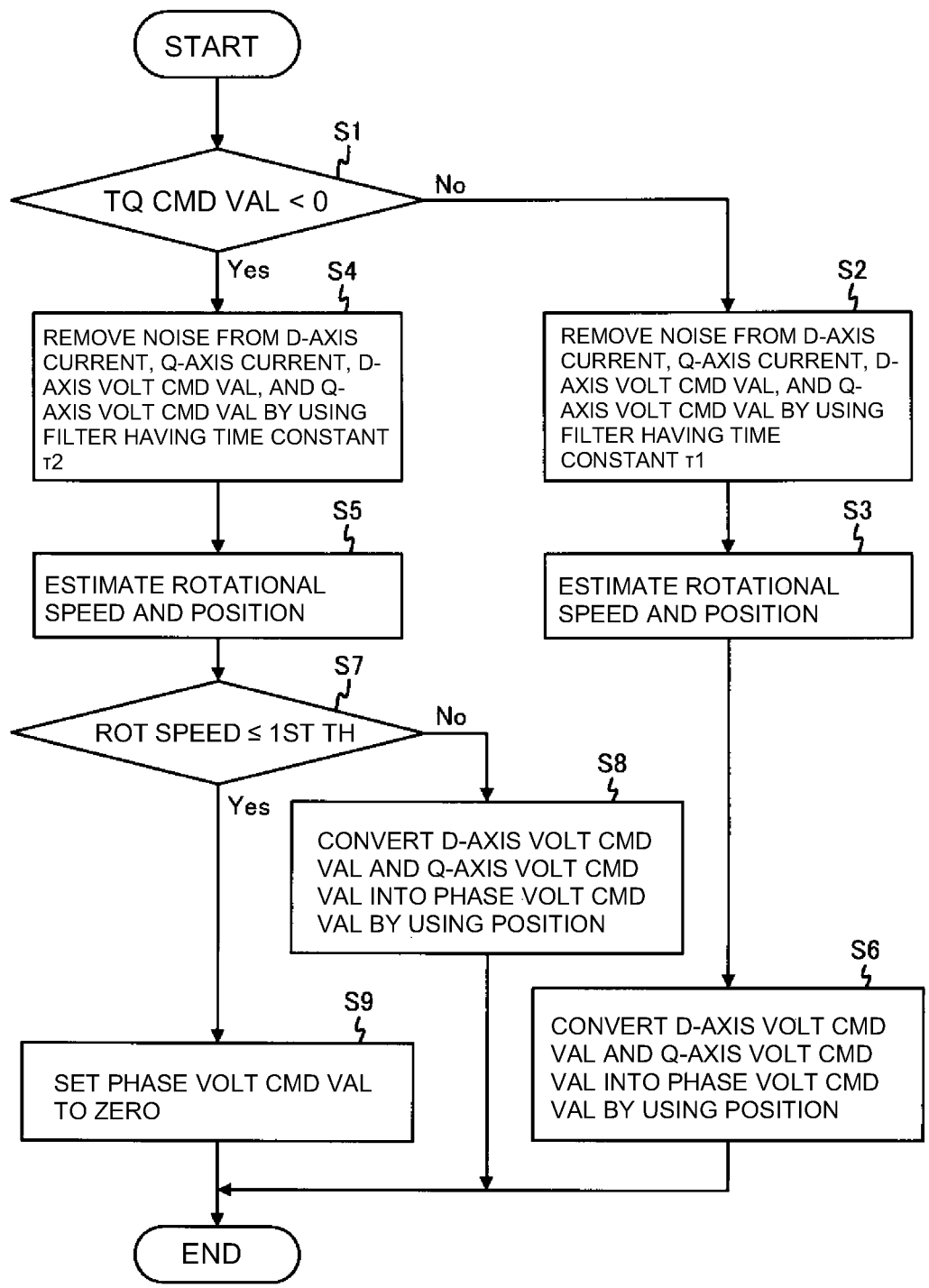
FIG. 4 is a flowchart illustrating an exemplary operation of a coordinate converter and an estimator according to a modification example 1.

FIG. 4 is a flowchart illustrating an exemplary operation of the coordinate converter 14 and the estimator 15 according to the modification example 1. The configuration of the controller 1 of the modification example 1 is the same as that of the controller 1 illustrated in FIG. 1.

First, when the torque command value T* is equal to or greater than zero (step S1: No), the estimator 15 removes a noise from the d-axis current Id, the q-axis current Iq, the d-axis voltage command value Vd*, and the q-axis voltage command value Vq* by using the filter having the time constant τ1 (step S2), and estimates the rotational speed ω and the position θ by using the d-axis current Id, the q-axis current Iq, the d-axis voltage command value Vd*, and the q-axis voltage command value Vq* from which the noise is removed in step S2 (step S3).

where Vin is input voltage, Vout is output voltage, f is frequency, C is capacitance, R is resistance, and τ(=C*R) is time constant.

Next, the coordinate converter 14 converts the d-axis voltage command value Vd* and the q-axis voltage command value Vq* into the U-phase voltage command value Vu*, the V-phase voltage command value Vv*, and the W-phase voltage command value Vw* by using the position θ estimated in step S3 (step S6).

When the torque command value T* is less than zero (step S1: Yes), the estimator 15 removes a noise from the d-axis current Id, the q-axis current Iq, the d-axis voltage command value Vd*, and the q-axis voltage command value Vq* by using the filter having the time constant τ2 (step S4), and estimates the rotational speed ω and the position θ by using the d-axis current Id, the q-axis current Iq, the d-axis voltage command value Vd*, and the q-axis voltage command value Vq* from which the noise is removed in step S4 (step S5).

Next, when the rotational speed ω estimated in step S5 is greater than the first threshold (step S7: No), the coordinate converter 14 converts the d-axis voltage command value Vd* and the q-axis voltage command value Vq* into the U-phase voltage command value Vu*, the V-phase voltage command value Vv*, and the W-phase voltage command value Vw* by using the position θ estimated in step S5 (step S8). For example, the first threshold is a rotational speed less than 1% of the maximum positive value of the rotational speed ω.

When the rotational speed ω estimated in step S5 is equal to or less than the first threshold (step S7: Yes), the coordinate converter 14 sets the U-phase voltage command value Vu*, the V-phase voltage command value Vv*, and the W-phase voltage command value Vw* to zero (step S9). This allows the duty cycle of each of the pulse width modulation signals Sg1 to Sg6 to be set to zero, thereby stopping the inverter circuit 2 so as not to apply torque to the electric motor M.

Accordingly, the controller 1 according to the modification example 1 is configured so that the U-phase voltage command value Vu*, the V-phase voltage command value Vv*, and the W-phase voltage command value Vw* are set to zero when the torque command value T* is less than zero and the rotational speed ω is equal to or less than the first threshold. This configuration may prevent the negative torque from being applied to the electric motor M and set the rotational speed ω to zero by using a friction force acting on the rotor after the rotational speed ω is reduced to a relatively low speed by negative torque applied to the electric motor M so as to stop the electric motor M, thereby preventing the reverse rotation of the electric motor M when the electric motor M is stopped.

Modification Example 2

Figure 5:
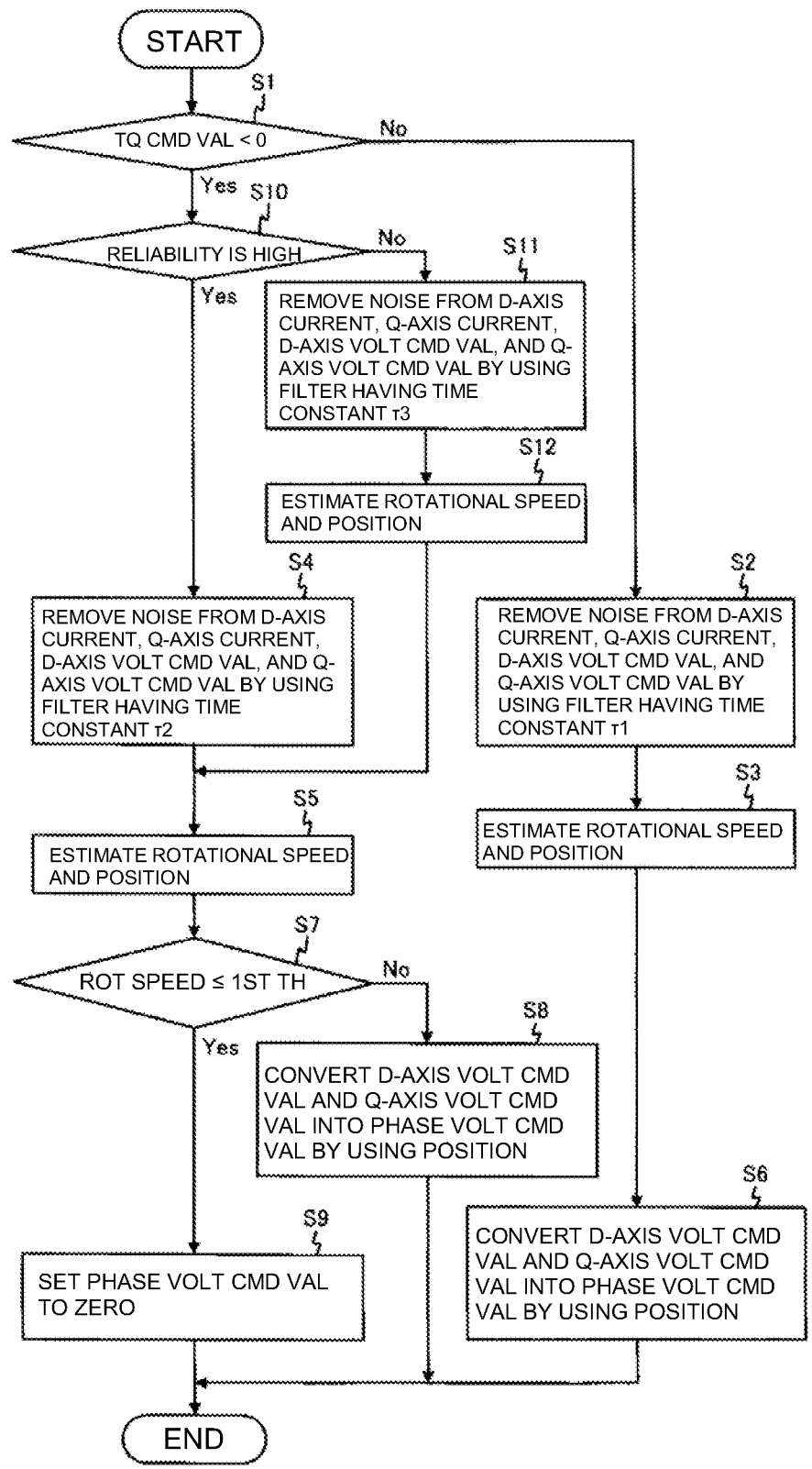
FIG. 5 is a flowchart illustrating an exemplary operation of a coordinate converter and an estimator according to a modification example 2.

FIG. 5 is a flowchart illustrating an exemplary operation of the coordinate converter 14 and the estimator 15 according to the modification example 2. The configuration of the controller 1 of the modification example 2 is the same as that of the controller 1 illustrated in FIG. 1.

First, when the torque command value T* is equal to or greater than zero (step S1: No), the estimator 15 removes a noise from the d-axis current Id, the q-axis current Iq, the d-axis voltage command value Vd*, and the q-axis voltage command value Vq* by using the filter having the time constant τ1 (step S2), and estimates the rotational speed ω and the position θ by using the d-axis current Id, the q-axis current Iq, the d-axis voltage command value Vd*, and the q-axis voltage command value Vq* from which the noise is removed in step S2 (step S3).

Next, the coordinate converter 14 converts the d-axis voltage command value Vd* and the q-axis voltage command value Vq* into the U-phase voltage command value Vu*, the V-phase voltage command value Vv*, and the W-phase voltage command value Vw* by using the position θ estimated in step S3 (step S6).

When the torque command value T* is less than zero (step S1: Yes) and the estimator 15 judges that the d-axis current Id, the q-axis current Iq, the d-axis voltage command value Vd*, and the q-axis voltage command value Vq* have high reliability (step S10: Yes), the estimator 15 removes a noise from the d-axis current Id, the q-axis current Iq, the d-axis voltage command value Vd*, and the q-axis voltage command value Vq* by using the filter having the time constant τ2 (step S4), and estimates the rotational speed ω and the position θ by using the d-axis current Id, the q-axis current Iq, the d-axis voltage command value Vd*, and the q-axis voltage command value Vq* from which the noise is removed in step S4 (step S5). For example, when the rotational speed ω is equal to or less than the second threshold, the estimator 15 judges that the d-axis current Id, the q-axis current Iq, the d-axis voltage command value Vd*, and the q-axis voltage command value Vq* have high reliability. In general, the less noise is included in the d-axis current Id, the q-axis current Iq, the d-axis voltage command value Vd*, and the q-axis voltage command value Vq* as the rotational speed ω decreases, so that the reliability of the d-axis current Id, the q-axis current Iq, the d-axis voltage command value Vd*, and the q-axis voltage command value Vq* increases. Accordingly, a decrease in the reliability of the d-axis current Id, the q-axis current Iq, the d-axis voltage command value Vd*, and the q-axis voltage command value Vq* is suppressed even when the noise is removed from the d-axis current Id, the q-axis current Iq, the d-axis voltage command value Vd*, and the q-axis voltage command value Vq* by the filter having the time constant τ2 (a filter having a relatively high cutoff frequency). The second threshold may have a value different from that of the first threshold, or a value same as that of the first threshold.

When the torque command value T* is less than zero (step S1: Yes) and the estimator 15 judges that the d-axis current Id, the q-axis current Iq, the d-axis voltage command value Vd*, and the q-axis voltage command value Vq* have low reliability (step S10: No), the estimator 15 removes a noise from the d-axis current Id, the q-axis current Iq, the d-axis voltage command value Vd*, and the q-axis voltage command value Vq* by using a filter having a time constant τ3 (i.e., a third time constant) that is smaller than the time constant τ1 and larger than the time constant τ2 (step S11), and estimates the rotational speed ω and the position θ by using the d-axis current Id, the q-axis current Iq, the d-axis voltage command value Vd*, and the q-axis voltage command value Vq* from which the noise is removed in step S11 (step S12). For example, when the rotational speed ω is greater than the second threshold, the estimator 15 judges that the d-axis current Id, the q-axis current Iq, the d-axis voltage command value Vd*, and the q-axis voltage command value Vq* have low reliability. In general, the more noise is included in the d-axis current Id, the q-axis current Iq, the d-axis voltage command value Vd*, and the q-axis voltage command value Vq* as the rotational speed ω increases, so that the reliability of the d-axis current Id, the q-axis current Iq, the d-axis voltage command value Vd*, and the q-axis voltage command value Vq* decreases. Accordingly, a decrease in the reliability of the d-axis current Id, the q-axis current Iq, the d-axis voltage command value Vd*, and the q-axis voltage command value Vq* is suppressed when the noise is removed from the d-axis current Id, the q-axis current Iq, the d-axis voltage command value Vd*, and the q-axis voltage command value Vq* by the filter having the time constant τ3 (a filter having a relatively low cutoff frequency).

Next, when the rotational speed ω estimated in step S5 is greater than the first threshold (step S7: No), the coordinate converter 14 converts the d-axis voltage command value Vd* and the q-axis voltage command value Vq* into the U-phase voltage command value Vu*, the V-phase voltage command value Vv*, and the W-phase voltage command value Vw* by using the position θ estimated in step S5 (step S8).

When the rotational speed ω estimated in step S5 is equal to or less than the first threshold (step S7: Yes), the coordinate converter 14 sets the U-phase voltage command value Vu*, the V-phase voltage command value Vv*, and the W-phase voltage command value Vw* to zero (step S9).

The coordinate converter 14 may be configured just to convert the d-axis voltage command value Vd* and the q-axis voltage command value Vq* into the U-phase voltage command value Vu*, the V-phase voltage command value Vv*, and the W-phase voltage command value Vw* by using the position θ output from the estimator 15.

Accordingly, the controller 1 according to the modification example 2 is configured to estimate the rotational speed ω and the position θ by using the d-axis current Id, the q-axis current Iq, the d-axis voltage command value Vd*, and the q-axis voltage command value Vq* from which a noise is removed by the filter having the time constant τ3 smaller than the time constant τ1 and larger than the time constant τ2 when the torque command value T* is less than zero and the rotational speed ω is greater than the second threshold. This configuration may suppress the estimation delay of the rotational speed ω and a decrease in the reliability of the d-axis current Id, the q-axis current Iq, the d-axis voltage command value Vd*, and the q-axis voltage command value Vq* while applying negative torque to the electric motor M so as to stop the electric motor M, thereby further suppressing the reverse rotation of the electric motor M while reducing time required for stopping the electric motor M.

REFERENCE SIGNS LIST

1 controller
2 inverter circuit
3 control circuit
4 storage unit
5 drive circuit
6 arithmetic unit
7 subtraction unit
8 torque controller
9 torque/current command value converter
10 coordinate converter
11 subtraction unit
12 subtraction unit
13 current controller
14 coordinate converter
15 estimator

The invention claimed is:

1. A controller for an electric motor comprising:
a torque controller configured to calculate a torque command value by using a difference between a rotational speed of the electric motor and a rotational speed command value;
a first converter configured to convert the torque command value into a d-axis current command value and a q-axis current command value;
a second converter configured to convert a current flowing in the electric motor into a d-axis current and a q-axis current by using a position of a rotor of the electric motor;
a current controller configured to calculate a d-axis voltage command value such that a difference between the d-axis current and the d-axis current command value is reduced, and calculate a q-axis voltage command value such that a difference between the q-axis current and the q-axis current command value is reduced;
an estimator configured to estimate the position by using the d-axis current, the q-axis current, the d-axis voltage command value, and the q-axis voltage command value from which a noise is removed by a filter having a first time constant when the torque command value is equal to or greater than zero, and estimate the rotational speed and the position by using the d-axis current, the q-axis current, the d-axis voltage command value, and the q-axis voltage command value from which the noise is removed by the filter, which has a second time constant smaller than the first time constant when the torque command value is less than zero;
a third converter configured to convert the d-axis voltage command value and the q-axis voltage command value into voltage command values respectively corresponding to phases of the electric motor by using the position; and
a drive circuit configured to drive the electric motor by a result of a comparison between a carrier wave and the voltage command values respectively corresponding to the phases of the electric motor.

2. The controller for the electric motor according to claim 1, wherein
the third converter is configured to set the voltage command values respectively corresponding to the phases of the electric motor to zero when the torque command value is less than zero and the rotational speed is equal to or less than a first threshold.

3. The controller for the electric motor according to claim 2, wherein
the estimator is configured to estimate
the rotational speed and the position by using the d-axis current, the q-axis current, the d-axis voltage command value, and the q-axis voltage command value from which the noise is removed by the filter having the second time constant when the torque command value is less than zero and the rotational speed is equal to or less than a second threshold; and
the rotational speed and the position by using the d-axis current, the q-axis current, the d-axis voltage command value, and the q-axis voltage command value from which the noise is removed by the filter, which has a third time constant smaller than the first time constant and larger than the second time constant when the torque command value is less than zero and the rotational speed is greater than the second threshold.

4. The controller for the electric motor according to claim 1, wherein the estimator is configured to estimate the rotational speed and the position by using the d-axis current, the q-axis current, the d-axis voltage command value, and the q-axis voltage command value from which the noise is removed by the filter having the second time constant when the torque command value is less than zero and the rotational speed is equal to or less than a second threshold; and the rotational speed and the position by using the d-axis current, the q-axis current, the d-axis voltage command value, and the q-axis voltage command value from which the noise is removed by the filter, which has a third time constant smaller the first time constant and larger than the second time constant when the torque command value is less than zero and the rotational speed is greater than the second threshold.

* * * * *